United States Patent
Leite et al.

(10) Patent No.: US 8,088,841 B2
(45) Date of Patent: Jan. 3, 2012

(54) PIGMENTABLE ASPHALT BINDER COMPOSITION

(75) Inventors: Leni Figueiredo Leite, Rio de Janeiro (BR); Cristina Pontes Bittencourt, Rio de Janeiro (BR); Adriana Tinoco Martins, Rio de Janeiro (BR); Mariana Guaranys de Oliveira Macedo, Rio de Janeiro (BR); Luiz Rosa Silva Filho, Rio de Janeiro (BR)

(73) Assignee: Petroleo Brasileiro S.A. -Petrobras, Rio de Janeiro (BR)

(*) Notice: Subject to any disclaimer, the term of this patent is extended or adjusted under 35 U.S.C. 154(b) by 0 days.

(21) Appl. No.: 12/578,239

(22) Filed: Oct. 13, 2009

(65) Prior Publication Data
US 2010/0029808 A1    Feb. 4, 2010

Related U.S. Application Data

(63) Continuation of application No. 12/174,247, filed on Jul. 16, 2008, now abandoned.

(30) Foreign Application Priority Data

Nov. 23, 2007   (BR) ...................................... 0704479

(51) Int. Cl.
*C04B 28/04*   (2006.01)

(52) U.S. Cl. .............................................. 524/4; 524/2
(58) Field of Classification Search ................... 524/2, 4
See application file for complete search history.

(56) References Cited

U.S. PATENT DOCUMENTS

| 5,389,137 A | 2/1995 | Linde et al. |
| 5,484,481 A | 1/1996 | Linde et al. |
| 6,048,447 A | 4/2000 | Hayner et al. |
| 2003/0047116 A1 | 3/2003 | Egger et al. |
| 2003/0149138 A1* | 8/2003 | Lemoine et al. ................ 524/59 |
| 2005/0143497 A1 | 6/2005 | Butler et al. |
| 2006/0081152 A1 | 4/2006 | Buras et al. |

OTHER PUBLICATIONS

Carolina Asphalt Pavement Association Glossary. 2003.*

* cited by examiner

*Primary Examiner* — Milton I Cano
*Assistant Examiner* — John Uselding
(74) *Attorney, Agent, or Firm* — Nixon & Vanderhye P.C.

(57) ABSTRACT

The present invention relates to the preparation of a pigmentable asphalt binder composition obtained from petroleum- and shale-refining streams, having a low content of asphaltenes, aromatic diluents of high aromaticity, polymers and inorganic pigments, obtaining a colored product. The composition of the present invention is employed in paving, permitting embellishment of roads, greater light reflection and reduction in coating temperature and in addition greater resistance to permanent deformation due to its excellent temperature susceptibility and higher softening point.

7 Claims, No Drawings

PIGMENTABLE ASPHALT BINDER COMPOSITION

This application is a continuation of U.S. patent application Ser. No. 12/174,247 filed Jul. 16, 2008, now abandoned, which claims priority to Brazilian Patent Application No. PI 0704479-8, filed Nov. 23, 2007. The entire contents of these applications are incorporated herein by reference.

FIELD OF THE INVENTION

The present invention relates to an asphalt binder composition. More particularly it relates to a pigmentable asphalt binder composition obtained from petroleum and shale products modified by thermoplastic polymer and endowed with colour through addition of inorganic pigments.

BACKGROUND OF THE INVENTION

Asphalt is the oldest material conferring impermeability used by man. The components of asphalt may be separated into asphaltenes and maltenes. Asphaltenes are defined as a fraction having a black colouring insoluble in n-heptane, whereas maltenes are constituted by saturated compounds, aromatic compounds and resins, soluble in n-heptane. The percentage composition of asphaltenes, maltenes and other constituents has a significant effect on the viscoeiastic properties of asphalts and, consequently, on the performance of road-paving mixtures.

The use of asphalts modified by polymers to improve the performance of paving asphalts has been observed throughout time properties of the asphalt matrix modified by polymers depend directly on the characteristics and concentration of such polymers and also on the nature of the asphalt matrix.

Currently there is a great variety of polymers being utilised in the modification of asphalt matrices. However the greatest obstacle to the use of modified asphalt matrices in practical paving is their tendency to phase separation due to poor compatibility between the polymer and the asphalt matrix.

In addition to current concern with the use of environmentally-safe products, it is also necessary to develop asphalt coatings having a lower temperature than the traditional temperature, plus greater resistance to permanent deformation, greater light reflection, and such products should provide support and safety for users in tunnels, on bridges and in curves on roads, enhancing the concentration of drivers.

The state of the art in respect of pigmentable compositions is described below.

U.S. Pat. No. 5,389,137 granted on Feb. 14, 1995 to Bayer AG, describes a process for asphalt colouring by compositions of inorganic pigments with oils having a kinematic viscosity at 40° C. from 1.6 to 1500 mm$^2$/s, or with waxes and paraffins having a softening point lying between 50° C. and 180° C.

U.S. Pat. No. 5,484,481, granted on Jan. 16, 1996 to Bayer AG, presents a process for colouring construction materials, such as concrete or asphalt, using inorganic granular pigments mixed with binders derived from petroleum or synthetic oils, or biodegradable oils of vegetable and animal origin, having a kinematic viscosity in a band from 1.6 to 1500 mm$^2$/s at 40° C. and inorganic pigments.

Patent application US 20030047116, published on Mar. 13, 2003, describes pigment compositions in a homopolar medium with dispersants for colouring bitumens and asphalts.

It transpires that as the state of the art utilises petroleum residues having a high content of asphaltenes and in addition utilises environmentally-dangerous diluents, the development is necessary of a product not possessing the disadvantages of the state of the art.

SUMMARY OF THE INVENTION

Consequently in the sense of overcoming the disadvantages of the state of the art, an objective of the present invention is to furnish a pigmentable asphalt composition.

The pigmentable asphalt composition of the present invention, in addition to providing a reduction in the temperature of the asphalt coating by up to 5° C., may be used for differentiation of urban roads and highways through colouring. Said pigmentable asphalt composition increases light reflection to levels similar to those of rigid paving, increasing safety at dangerous locations (curves, mountains and tunnels). In addition thereto the pigmentable asphalt composition of the present invention promotes road embellishment as such road coating may be yellow, brown, green or grey.

DETAILED DESCRIPTION OF THE INVENTION

The coloured asphalt of the present invention comprises:
a mixture of light-coloured aggregates; and
a pigmentable asphalt binder.

The pigmentable asphalt binder of the present invention comprises:
petroleum asphalt cement (CAP);
deasphaltation residue or vacuum residue, modified by polymers;
diluents derived from shale oil and petroleum;
inorganic pigments; and
optionally, fillers.

Light-coloured aggregates, i.e. of colouring ranging from white to grey, used in the coloured asphalt composition are preferentially selected from among limestone, granite, basalt or gneiss (metamorphic rock of medium to course granulometry predominantly composed of feldspar, quartz and biotite mica), including sand.

The polymers utilised for modifying deasphaltation residue or vacuum residue are polymers of the styrene-butadiene-styrene type (SBS) and/or ethylene vinyl acetate (EVA) copolymer.

The inorganic pigments utilised in the present invention maybe selected from among iron oxide, lead chromate, cobalt aluminate, chromium oxide and titanium oxide.

The fillers optionally used, may be selected from among hydrated lime and/or Portland cement.

The process for obtaining the asphalt binder of the present invention is realised by stirring at 500 to 4500 rpm at a temperature of 160° C. to 175° C. for 2 to 4 hours, depending on the quantity and type of components involved in the formulation.

The asphalt binder of the present invention has the consistency of asphalt cement, having a penetration of the order of 30 to 120 dmm at 25° C., low content of asphaltenes (2% to 4%), viscosity at 135° C. from 200 to 600 cP, softening point from 45° C. to 60° C. and density from 0.97 to 1.05. Such low content of asphaltenes is essential to promote pigmentation of the binder by virtue of asphaltenes being solid black materials not susceptible to being pigmented. The process for obtaining a pigmentable asphalt binder is preferentially obtained from a mixture of petroleum asphalt cement (CAP), CAP 50/70 or CAP 30/45 or vacuum residue or even deasphaltation residue (30% to 50% w/w), with petroleum and shale diluents (5% to 30% w/w), SBS (styrene-butadiene-styrene) and ethylene vinyl acetate (EVA) copolymers (5% to 15% w/w), fillers (0% to 15% w/w) and pigments (2% to 20% w/w).

The components providing consistency to the pigmentable binder proposed for this formulation (asphalt cements and residues) must possess a low content of asphaltenes, a maximum of 7%, and a penetration ranging from 15 to 70 dmm, being diluted prior to being modified by polymer with shale diluents. Shale diluents do not contain asphaltenes and the viscosity thereof at 60° C. lies in a band from 2 to 100 P. The diluents of aromatic nature derived from shale have an aromaticity lying in a band from 35% to 50% (aromatic carbon content by nuclear magnetic resonance—NMR), being essential for swelling the polymers and homogeneity of the final product.

The thermoplastic copolymers utilised are commonly used in paving. SBS (styrene-butadiene-styrene) copolymer has a linear structure, styrene 30% w/w, apparent density of 0.27 q/cm$^3$, breaking stress of 23 MPa, elongation at break 800%, and viscosity in a 25% toluene solution of 4000 cP. EVA (ethylene vinyl acetate) copolymer contains vinyl acetate 28%, having a melting point of 75° C. and softening point of 174° C.

Inorganic fillers may be present in the compositions at up to 15% w/w, being of white to grey hue, and may be talc, hydrated lime, quicklime or even Portland cement.

The inorganic pigments employed are of the iron oxide (yellow to red), lead chromate (light yellow), cobalt aluminate (blue), chromium oxide (green) and titanium oxide (white) type.

The coloured asphalt mixture resulting from admixture of pigmentable binder with white to grey aggregates presents a colour depending on the pigment employed, ranging from terracotta to brown and moss green, and the stone utilised, being lighter the whiter the stone.

The present invention describes the preparation of pigmentable asphalt binder obtained from streams from petroleum and shale refining having a low content of asphaltenes, aromatic diluents having high aromaticity, polymers and inorganic pigments, obtaining a product of terracotta, red or dark green colour depending on the pigment employed to promote colouring of asphalt mixtures used in paving, permitting embellishment of roads, better light reflection and reduction in coating temperature and, in addition, greater resistance to permanent deformation due to its excellent temperature susceptibility and higher softening point.

The polymers were incorporated following dilution of the asphalt cement or of the residues with diluents in diverse proportions, employing a high-shear mixer.

It is important to emphasise the importance of the aromatic diluent originating from shale oil in the present compositions by virtue of their high aromaticity permitting swelling the polymers and promoting homogeneity of the constituents with inorganic pigments.

Mixing time and temperature depend on the difficulty of incorporation of such polymers, lying in a band from 160° C. to 175° C. and from 2 to 4 hours. Fillers and pigments are added following incorporation of the polymers.

The invention will be illustrated in greater detail making reference to the example hereinafter, however it shall he understood that the present invention is not limited thereto.

EXAMPLE

CAP 50/70 with Aromatic Diluent

Into a glass reactor of 1 kg capacity fitted with a high-shear mixer and temperature-controlled heating mantle were introduced 400 g of deasphaltation residue and 300 g of aromatic diluent. To said mixture were added 17,5 g of SBS, 17.5 g of EVA, 26.6 g of titanium oxide, 105 g of green pigment based on iron oxide, at a temperature of 175° C. for 2 hours at 3000 rpm. The product created was recorded as A.

The results are shown in Table 1. There was no problem of heterogeneity and the properties obtained are those of a modified asphalt with good temperature susceptibility and good resistance to ageing, being capable of hot application in mixtures with aggregates in asphalt coatings without presenting problems of permanent deformation and fatigue.

Asphalt mixtures prepared with limestone aggregates, sand or the pigmentable binder of the present invention present satisfactory mechanical properties, having a cohesive strength at 25° C. of the order of 0.8 to 1 MPa, within values typical for binders having a penetration of between 80 and 120 dmm. The softening point thereof of 57° C. ensures greater resistance to permanent deformation and the colour obtained was terracotta. The resultant colour permits differentiation from conventional paving, being dark of black hue, permitting greater safety and support for drivers at locations requiring greater attention in addition to bringing about a reduction in temperature.

TABLE 1

MODIFIED ASPHALT ACCORDING TO THE EXAMPLE

| Test | Product of the invention (A) |
| --- | --- |
| Penetration at 25° C., 100 g, 5 s, dmm | 109 |
| Softening point, ° C. | 57 |
| Viscosity at 135° C., cP | 705.5 |
| TSI | +2.8 |
| Ageing in RTFOT oven | |
| Mass change (% w/w) | −0.0742 |
| Penetration at 25° C., 100 g, 5 s, dmm | 88 |
| Softening point, ° C. | 52.9 |

Consequently from the results herein presented it may be verified that the present invention, in addition to using environmentally more correct products, provides a product satisfying the specifications in the matter in terms of consistency, temperature susceptibility and content of asphaltenes. In addition thereto the product of the present invention is economically more viable than coatings of the state of the art.

Whilst the present invention has been described in detail incorporating specific references to the example, it shall be apparent to a person experienced in the art that various alterations and modifications may be made thereto without thereby deviating from its spirit and scope.

The invention claimed is:

1. A pigmentable asphalt binder composition comprising:
a mixture of light-coloured aggregates; and
a pigmentable asphalt binder, wherein said pigmentable binder comprises:
petroleum asphalt cement (CAP);
deasphaltation residue or vacuum residue, modified by polymers;
diluents derived from shale oil, wherein the diluents contain 35% to 50% aromatic carbons, have a viscosity in a range of 2 to 100 P at 60° C., and do not contain asphaltene;
inorganic pigments; and
optionally, containing fillers,
wherein the pigmentable asphalt binder has an asphaltene content of 2 to 4%, wherein the composition contains 30 to 50 wt % of an asphalt cement or deasphaltation residue or vacuum residue containing no more than 7 wt % of asphaltenes,
wherein the composition contains 5 to 15 wt % polymers,
wherein the composition contains 5 to 30 wt % diluents derived from shale oil,
wherein the composition contains 2 to 20 wt % inorganic pigments,
wherein the composition contains up to 15 wt % fillers.

2. A pigmentable asphalt binder composition according to claim 1, wherein said light-coloured aggregates are selected from among limestone, granite, basalt or gneiss, including sand.

3. A pigmentable asphalt binder composition according to claim 1, wherein said polymers utilized for modifying said deasphaltation residue or vacuum residue are polymers of the styrene-butadiene-styrene type (SBS) and/or ethylene vinyl acetate (EVA) copolymer.

4. A pigmental asphalt binder composition according to claim 1, wherein said inorganic pigments are selected from among iron oxide, lead chromate, cobalt aluminate, chromium oxide and titanium oxide.

5. A pigmentable asphalt binder composition according to claim 1, wherein said fillers are selected from among hydrated lime and/or Portland cement.

6. A pigmentable asphalt binder composition as defined in claim 1, wherein incorporation of said polymers is effected following dilution of said asphalt cement or of said residues with diluents, wherein mixing is carried out in a band of temperature from 160° C. to 175° C. and during a period of from 2 to 4 hours.

7. A pigmental asphalt binder composition according to claim 6, wherein said fillers and pigments are added following incorporation of said polymers.

* * * * *